2,951,289
EAVES TROUGH CUTTER

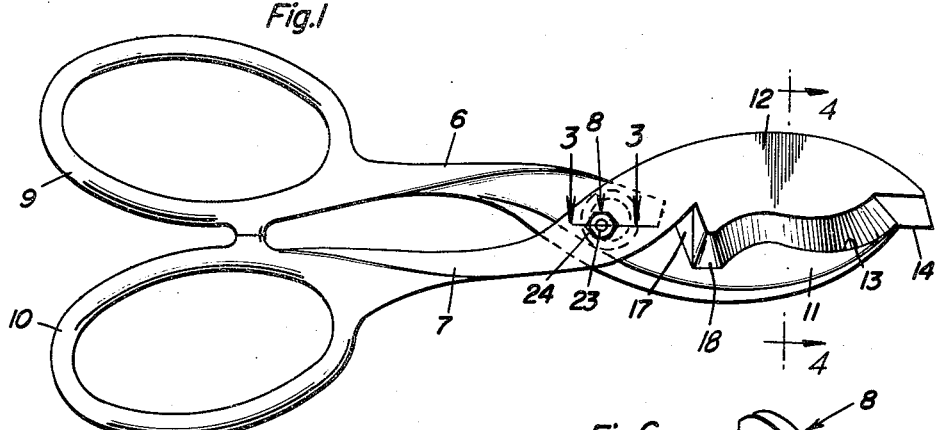
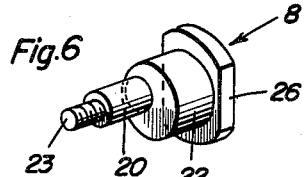
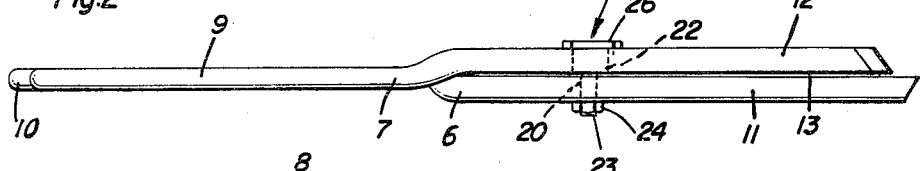
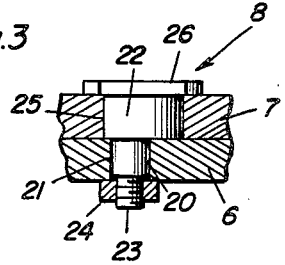
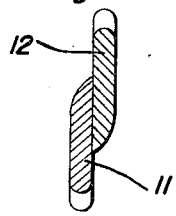
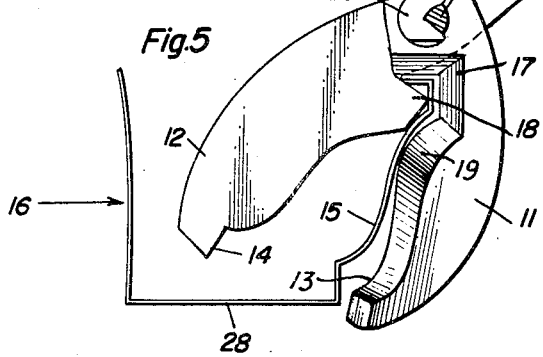
Warren R. De Ferbrache
Richard P. Mass
INVENTORS

Warren R. De Ferbrache, Rte. 2, Osceola, Ind., and Richard P. Mass, 1049 N. Adams St., South Bend, Ind.

Filed Nov. 3, 1958, Ser. No. 771,448

4 Claims. (Cl. 30—254)

This invention relates generally to new and useful improvements in sheet metal shears and has for its primary object to provide, in a manner as hereinbefore set forth, a tool of this character which is particularly adapted to expeditiously and cleanly cut box-type eaves troughs to any desired length.

Another very important object of the present invention is to provide a tool of the character described wherein the pivotally connected blades may readily be adjusted relative to each other for efficiently cutting box-type eaves troughs comprising slight structural differences.

Other objects of the invention are to provide an eaves trough cutter of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in side elevation of an eaves trough cutter constructed in accordance with the present invention;

Figure 2 is a top plan view of the tool;

Figure 3 is an enlarged fragmentary view in horizontal section, taken substantially on the line 3—3 of Figure 1;

Figure 4 is a view in transverse section, taken substantially on the line 4—4 of Figure 1;

Figure 5 is a side elevational view of the tool, showing the device in use; and

Figure 6 is a detail view in perspective of the rotatably adjustable pivot.

Referring now to the drawing in detail, it will be seen that the embodiment of the invention which has been illustrated comprises a pair of elongated handles 6 and 7 of suitable metal. At one end, the handles 6 and 7 are crossed and pivotally and adjustably connected, as indicated at 8. The other or free ends of the handles 6 and 7 are provided with integral thumb and finger receiving loops 9 and 10.

Formed integrally with the pivotally connected ends of the handles 6 and 7 are coacting holding and cutting blades 11 and 12. The blades 11 and 12 comprise, respectively, cutting edges 13 and 14 which conform substantially to the cross-sectional shape of the usual outer longitudinal side wall 15 of a conventional box-type eaves trough 16. Toward this end, the cutting edge 13 of the holding blade 11 includes a substantially U-shaped inner end portion 17 which accommodates the usual lateral channel 18 on the upper portion of the wall 15 of the trough 16. Then, the cutting edge 14 of the blade 12 comprises a complemental projecting inner end portion 19 which is engageable in the channel 18 for coaction with the portion 19 of the cutting edge 13.

The pivot 8 includes a pin 20 which is engaged in an opening 21 provided therefor in the handle 6. Formed integrally with one end of the pin 20 is an off-center cylindrical bearing 22 which abuts the handle 6. The other end portion of the pin 20 is reduced and threaded, as at 23, to receive a retaining nut 24. The handle 7 is journalled on the bearing 22. Toward this end, the handle 7 is provided with a relatively large circular opening 25 which accommodates the bearing 22. A head 26 on the bearing 22 secures the handle 7 in position thereon.

It is thought that the use of the tool will be readily apparent from a consideration of the foregoing. Briefly, the handles 6 and 7 are swung away from each other on the pivot 8 for opening the blades 11 and 12 for receiving the wall 15 of the trough 16 to be cut therebetween. As hereinbefore stated, the recess 17 in the cutting edge 13 of the blade 11 receives the channel 18 of the trough. The handles 6 and 7 are then swung toward each other for closing the blades 11 and 12 on the trough wall 15. The construction and arrangement is such that the initial cut is made with a shearing and slicing action on the usual inturned, folded top flange 27 of the trough wall 15. From the point 27 the cut progresses through the wall 15 to the bottom 28 of the trough 16. To accommodate troughs which may differ slightly in construction, the blades 11 and 12 may be relatively adjusted. This is accomplished by simply loosening the retaining nut 24 and turning or rotating the pivot 8 comprising the off-center bearing 22, in the opening 21 of the handle 6. Of course, when the desired adjustment is had, the nut 24 is again tightened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A metal cutting shears adapted for cutting box-type eaves troughs having a curved front face and a return flanged top edge; comprising a pair of handles having a pivot fulcrum connecting the handles and two blades forming extensions of the handles at the opposite sides of said fulcrum, complementary cutting edges of said blades having oppositely inclined sides which effect bending and spreading action on said metal trough as it is severed along a single cutting line, a notch in one cutting edge of one blade which conforms in outline to the flanged top edge of the outer face of said trough at its edge and a complementary projecting cutting edge of the other blade which is proportioned to close within said notch to effect cutting engagement with the trough at a point closely adjacent but spaced from the top edge of said trough to effect an initial shearing of the trough inwardly of said top edge and before the blades are closed over the top edge of said trough to effect a clamping and cutting action on the box trough wherein said blades are closed to perform a line cutting operation in opposite directions from said initial shearing point, and curvilinear cutting edges of said blades corresponding approximately in outline to the cross section of said box, and terminal cutting edges of said blades of rectilinear shape and closing one over the other at completion of the cutting operation.

2. A metal cutting shears adapted for cutting box-type eaves troughs having a curved front face and a flanged top edge comprising a pair of handles having end portions adapted for gripping and a fulcrum pin received through said handles and joining them pivotally together, a cutting blade constructed as an extension of each said handle whereby said handles and blades are at opposite sides of said fulcrum pin, a cutting edge on one of said blades having a recess disposed adjacent the fulcrum pin, a curvilinear cutting edge formed as a continuation of said recess and terminating in an outer rectilinear cutting edge, a cutting projection on the edge of the other blade which is complementary with said notch and closes into cutting relation with said notch to initially effect a clamping and cutting action at a surface of the box trough which is displaced from the top edge of said trough whereby cutting action is initiated inwardly of said top edge and progresses simultaneously in opposite directions from said initially cut portion, a curvilinear cutting edge of said other blade which closes in cutting relation with said one blade over said trough following the initial cutting and clamping action whereby a single line of cut is effected as the handles are forced together, an outer rectilinear cutting edge of said other blade closing over the other outer rectilinear blade edge at completion of the cutting operation, and inclined surfaces of said blades which effect bending of the severed portions of trough as it is being cut and in opposite directions to provide contact between the closing blades and unsevered sections of trough.

3. A metal cutting shears adapted for cutting box-type eaves troughs having a curved front face and a reinforced top edge; comprising a pair of handles having a fulcrum pivotally connecting the handles and two blades forming extensions of said handles on the sides of said fulcrum oppositely from said handles, complementary cutting edges of said blades, oppositely inclined faces of said cutting edges which effect bending and spreading action on the severed portion of said trough as it is being cut to present an opened surface of said trough to the advancing cutting edges of said blades as they are closed one over the other, a notch in the cutting edge of one blade closely adjacent its fulcrum and which substantially conforms in outline to the top edge of said trough, a curvilinear extension of said one blade which substantially conforms in outline to the outer surface of said trough, a projecting cutting edge of said other blade which is complementary with said notch and closes within said notch to effect an initial cutting and clamping action at a portion of said trough inwardly from its top edge and progresses in opposite directions, a curvilinear cutting edge of said other blade which is formed as a continuation of said projecting cutting edge and closes over the curvilinear cutting edge of said one blade to provide a continuous cutting operation along the cross section of said trough starting from said point of initial cut and continuing toward the base of said trough.

4. A metal cutting shears for cutting box-type eaves troughs having a curved front face with a return flanged top edge; comprising two blades, means for fulcrumming said blades for cutting action therebetween, said one blade having a cutting edge profile which is of substantially the same dimension as the outer front face of said box-type trough and includes a notch which corresponds with the top front face and return flanged top edge of said trough, said second blade having a cutting edge which extends along a portion of said other blade defining a project, which project closes within said notch and further extends along a recess at the portion closely adjacent said fulcrum, said projection being proportioned to close within said notch to effect an initial cutting and clamping action on that portion of the box trough adjacent the return flanged top edge, said recess contour providing a portion of non-closure between the cutting edges at the top edge of said trough and proportioned to close over said top edge at the completion of the cutting operation, curvilinear cutting edges of said blades effecting progressive cutting action which proceeds from the top portion of said trough toward the base thereof, the work supporting surfaces of said blades being inclined to provide a bending action on said trough at the severed portions of said trough and opening the trough to the advancing cutting edges of said blades as they close one over the other.

References Cited in the file of this patent
UNITED STATES PATENTS

| | | |
|---|---|---|
| 596,546 | Runyan | Jan. 4, 1898 |
| 1,286,093 | Poplawski | Nov. 26, 1918 |